United States Patent Office 2,978,519
Patented Apr. 4, 1961

2,978,519
PROCESS FOR THE MANUFACTURE OF FLUOROCARBON WAXES

Edgar Fischer, Frankfurt am Main, Germany, assignor to Farbwerke Hoechst Aktiengesellschaft vormals Meister Lucius & Bruning, Frankfurt am Main, Germany, a corporation of Germany No Drawing. Filed May 9, 1958, Ser. No. 734,115
Claims priority, application Germany May 14, 1957
7 Claims. (Cl. 260—653.1)

The present invention relates to a process for the manufacture of fluorocarbon waxes.

It is known that in the thermal treatment of polytetrafluoroethylene a degradation takes place while, for the most part, the monomer is formed again (cf. Lewis and Naylor, Am. Chem. Soc. 69 (1947), page 1968; Norman Grassie "The Chemistry of High Polymer Degradation Processes," Butterworths Scientific Publications, London, 1956, page 80 last paragraph and page 81 at the top).

Under certain degradation conditions there can be obtained from polytetrafluoroethylene perfluoropropylene (U.S. Patent 2,759,983) which is probably not formed primarily by the degradation but which represents a reaction product of monomeric tetrafluoroethylene first obtained since the same reaction products can be directly produced under analogous conditions from said monomer (U.S. Patent 2,758,138).

When cautiously subjecting polytetrafluoroethylene to a thermal treatment it is possible to obtain a fluorine wax. The carrying out of this process on an industrial scale encounters, however, great difficulties. Large amounts of highly corrosive reaction products are formed which rapidly destroy the containers made of the usual materials. Only nickel and the alloys thereof are more resistant. But even when operating in containers of these materials it is difficult to obtain products which are not contaminated with the corrosion products of the container material since the wax produced cannot be purified by usual methods, for example by a simple distillation. In case high yields of wax are desired it is furthermore necessary to use the starting material, if possible, in the form of films. More compact pieces exhibit a very unfavorable heat transfer and thermal conductivity and, therefore, require considerable reaction periods which, due to the progressive degradation, involve remarkable losses by the formation of low boiling products. The same difficulties occur when a powdery product is used as starting material. It is not possible to improve the heat transfer by stirring since polytetrafluoroethylene of high molecular weight is thermally decomposed without melting and it becomes rubber-like at a temperature above the transition point (327° C.) and in case it is stirred it strongly tends to form lumps.

Now I have found that polytetrafluoroethylene can surprisingly be decomposed in salt melts having a melting point below the transition point of polytetrafluoroethylene, that is to say below 327° C., for example in a melt of potassium pyrosulfate, an alkali metal nitrate, such as sodium nitrate, potassium nitrate, an alkali metal nitrite, such as sodium nitrite, potassium nitrite, and that a fluorocarbon wax can thus be obtained in the form of a clear melt. In suitable melts of salt mixtures, that is to say mixtures which form a homogeneous melt, at the cracking temperature, such as a molten mixture of potassium, pyrosulfate and copper sulfate, potassium pyrosulfate and cobaltous sulfate, the degradation takes place particularly fast so that the above-mentioned difficulties practically do not appear. Salts which are less suitable alone, for example zinc chloride, since in such a salt melt the polytetrafluoroethylene is decomposed for example with the simultaneous formation of carbon, can successfully be used in many cases in admixture with other salts. For example a mixture of zinc chloride and cupric chloride is well suitable.

In the process of the invention the most favorable temperature for the wax formation is in the range between 300 and 600° C., preferably between 400 and 500° C. It is furthermore of advantage to provide for a good mixing in the course of the reaction, for example by stirring or shaking. In the process of the invention for the manufacture of wax there may be also used sintered pieces as obtained as scrap, for example when working semi-finished products of polytetrafluoroethylene. Powders may likewise be used. The fluorocarbon wax obtained represents a valuable product which is suitable for many applications owing to its outstanding physical and chemical behavior. It is distinguished, for example, by an extraordinarily low surface energy and can, therefore, be used with advantage in cases where a surface energy as low as possible is desired, for example as impregnating agent.

In order successfully to carry out the process of the invention the salts of the melt used are of importance. It, therefore, results that the salt melt, does not only act as heat carrier. The chemical and physical composition of the melt largely influences the cracking reaction. From among the halogen-containing salts it is little suitable to use, for example, a zinc chloride melt since in this case the degradation takes place with the formation of carbon which is obtained in addition to inaltered starting material. In case, however, the reaction is carried out in a molten mixture of potassium chloride and cupric chloride, the other conditions being the same, a wax is rapidly produced without the formation of carbon.

The following examples serve to illustrate the invention but they are not intended to limit it thereto; the parts being by weight.

Example 1

A mixture of 170 parts of $CuCl_2$ and 200 parts of KCl is melted in a melting vessel of Jena glass provided with a stirrer. 100 parts of polytetrafluoroethylene scrap are then introduced at 450° C. and the temperature is maintained at 450–480° C. while stirring. The reaction is practically terminated after 20 minutes. Above the dark melt of salt there is obtained the molten fluorocarbon wax as a water-clear layer. After the usual treatment a yield of about 96 parts of the reaction product is obtained in the form of a white friable wax having a high crystallinity and melting at a temperature above 300° C.

Examples 2–7

The reaction is carried out as described in Example 1 in the following melts using each time 100 parts of polytetrafluoroethylene scrap as obtained for example when mechanically treating semi-finished products of polytetrafluoroethylene

| Example | salts | temp., ° C. | time, minutes | yield, parts | remarks |
|---|---|---|---|---|---|
| 2 | 270 parts $ZnCl_2$ <br> 30 parts $CuCl_2$ | 450–480 | 10 | 92 | |
| 3 | 240 parts $ZnCl_2$ <br> 60 parts $FeCl_3$ | 450–480 | 10 | 90 | product contains carbon. |
| 4 | 300 parts $ZnCl_2$ | 450–480 | 10 | 90 | Do. |
| 5 | 300 parts $K_2S_2O_7$ | 450–480 | 10 | 93 | |
| 6 | 290 parts $K_2S_2O_7$ <br> 10 parts $CuSO_4$ | 450–480 | 10 | 94 | |
| 7 | 300 parts $KNO_3$ | 450–480 | 10 | 88 | |

I claim:

1. A process for the manufacture of fluorocarbon waxes by cracking polytetrafluoroethylene, which comprises heating polytetrafluoroethylene in a salt melt having a melting point below 327° C. at a temperature within the range of 300–600° C.

2. A process for the manufacture of fluorocarbon waxes by cracking polytetrafluoroethylene, which comprises heating polytetrafluoroethylene in a salt melt having a melting point below 327° C. at a temperature within the range of 400–500° C.

3. A process for the manufacture of fluorocarbon waxes by cracking polytetrafluoroethylene in a salt melt having a melting point below 327° C. of a member selected from the group consisting of potassium pyrosulfate, alkali metal nitrates, alkali metal nitrites, a mixture of potassium pyrosulfate and cupric sulfate, potassium pyrosulfate and cobaltous sulfate, zinc chloride and cupric chloride, potassium chloride and cupric chloride, at a temperature in the range of 300–600 ° C.

4. A process as claimed in claim 3, wherein said salt melt consists essentially of a mixture of about 270 parts of zinc chloride and about 30 parts of cupric chloride at a temperature in the range of 450–480° C.

5. A process as claimed in claim 3, wherein said salt melt consists essentially of a mixture of about 290 parts of potassium pyrosulfate and about 10 parts of cupric sulfate at a temperature in the range of 450–480° C.

6. A process as claimed in claim 3, wherein said salt melt consists essentially of potassium nitrate at a temperature in the range of 450–480° C.

7. A process as claimed in claim 3, wherein said salt melt consists essentially of potassium pyrosulfate at a temperature in the range of 450–480° C.

References Cited in the file of this patent

UNITED STATES PATENTS

| | | |
|---|---|---|
| 2,551,573 | Downing et al. | May 8, 1951 |
| 2,664,449 | Miller | Dec. 29, 1953 |